United States Patent
Crasser

(10) Patent No.: US 6,604,668 B2
(45) Date of Patent: Aug. 12, 2003

(54) MULTI-HEAD FRICTION WELDING METHOD

(75) Inventor: Leonhard Crasser, Naila (DE)

(73) Assignee: Multi Orbital Systems GmbH, Naila (DE)

( * ) Notice: Subject to any disclaimer, the term of this patent is extended or adjusted under 35 U.S.C. 154(b) by 0 days.

(21) Appl. No.: 10/072,386

(22) Filed: Feb. 7, 2002

(65) Prior Publication Data

US 2002/0070259 A1 Jun. 13, 2002

Related U.S. Application Data

(63) Continuation-in-part of application No. PCT/EP00/05678, filed on Jun. 20, 2000.

(30) Foreign Application Priority Data

Aug. 12, 1999 (DE) .......................... 199 38 100

(51) Int. Cl.[7] .............................................. B23K 20/12
(52) U.S. Cl. ..................... 228/112.1; 228/2.1; 228/113; 156/76.3
(58) Field of Search ................ 228/112.1–114.5, 228/212, 2.1, 2.3; 156/73.5, 73.6, 580–583.91

(56) References Cited

U.S. PATENT DOCUMENTS

| | | | | |
|---|---|---|---|---|
| 2,326,549 A | * | 8/1943 | Miller ........................... 52/211 |
| 3,777,967 A | * | 12/1973 | Searle et al. ................... 228/2.1 |
| 3,860,468 A | * | 1/1975 | Scherer ....................... 156/73.5 |
| 3,920,504 A | * | 11/1975 | Shoh et al. ................... 156/580 |
| 4,090,799 A | * | 5/1978 | Crotti et al. ................. 403/401 |
| 4,391,054 A | * | 7/1983 | Schovee ........................ 40/700 |
| 4,844,320 A | * | 7/1989 | Stokes et al. ................ 228/102 |
| 4,856,230 A | * | 8/1989 | Slocomb ........................ 49/504 |
| 4,936,502 A | * | 6/1990 | Schlarb et al. .............. 228/102 |
| 5,189,841 A | * | 3/1993 | Arbetter ........................ 49/504 |
| 5,293,723 A | * | 3/1994 | Slessor ......................... 52/213 |
| 5,439,546 A | * | 8/1995 | Brickenstein ............. 156/304.2 |
| 5,518,562 A | * | 5/1996 | Searle et al. ................ 156/73.5 |
| 5,849,146 A | * | 12/1998 | Searle et al. ................. 156/580 |
| 5,902,657 A | * | 5/1999 | Hanson et al. ........... 428/36.92 |
| 6,145,730 A | * | 11/2000 | Wiesemann .............. 228/112.1 |

FOREIGN PATENT DOCUMENTS

WO    WO 01/12424    *  2/2001

* cited by examiner

Primary Examiner—Tom Dunn
Assistant Examiner—Zidia Pittman
(74) Attorney, Agent, or Firm—Klaus J. Bach

(57) ABSTRACT

For the manufacture of miter-welded profile rod frames by friction welding, a welding apparatus with friction welding units is used with which permits the welding of all miter joints of a frame to be made concurrently within a very short period and with very little displacement of welding material.

15 Claims, 4 Drawing Sheets

US 6,604,668 B2

MULTI-HEAD FRICTION WELDING METHOD

This is a Continuation-in-Part application of international application PCT/EP00/05678 filed Jun. 20, 2000 and claiming the priority of German application 199 38 100.3 filed Aug. 12, 1999.

BACKGROUND OF THE INVENTION

The invention relates to a multi-head friction welding method for the concurrent welding of connecting surface areas of open or closed profile frames.

Friction welding methods as such are basically known wherein, by relative movement of two components under pressure, friction is generated so as to provide for the energy needed for melting the material at the surfaces to be welded together. The components to be welded together are generally linearly symmetrical or rotationally symmetrical. The procedure however is not suitable for the welding of asymmetrical components such as profile rods for profiled window or door frames.

For the manufacture of window and door frames of plastic profile rods, the surface areas to be joined are generally cut to the desired miter bevel and then welded together by a so-called mirror welding process. (DE-A-41 18 258). The concurrent welding of the miter areas of such profile frames using welding mirrors is known as multi-head compression butt welding wherein the surface areas to be joined are heated up to their melting point and are then, after removal of the mirrors, joined under pressure (DE-A-19 50 236). This multi-head pressure butt welding procedure has disadvantages particularly because of long processing times, that is, the time required for the heating and the melting, the joining and the hardening of the joint areas. Since the heat is dissipated from the joint area only slowly, the unavoidable large weld bulges formed in the process can be cut away only after a waiting period of several minutes. The removal of the bulges is furthermore quite complicated, particularly in the inner and in the corner areas. Finally, such multi-head pressure butt welding apparatus consume a relatively large amount of energy since the welding mirrors must be maintained continuously at operating temperature, also during the periods in which no welding takes place. Furthermore, oxidation layers are formed on the surface of the mirrors which must be removed for which procedure generally mirror envelopes of Teflon foils are used, which are quite costly.

It is therefore the object of the invention to provide a multi-head friction welding method and an apparatus suitable for performing the method whereby the disadvantages of the multi-head pressure butt welding method can be overcome and with which, at the same time, several or all the joint surface areas of profile frames consisting of profile rods can be welded at the same time and in shorter periods as compared with welding mirror processes and without the formation of large weld bulges.

SUMMARY OF THE INVENTION

This object is solved in accordance with the method and apparatus wherein the individual profile rods of the profile frames are firmly held in friction welding heads and the two surfaces to be joined are pressed against each other, the respective free ends of the profile rods at opposite sides of the jointure are caused to vibrate by means of the friction welding heads wherein the two friction welding heads vibrate 180° out of phase in the X, Z and Y, Z direction and the friction welding heads receiving the free ends of each individual profile rods also vibrate essentially 180° of phase. In order to generate the lowest possible amount of force vectors in the longitudinal direction of the profile rods, the two friction welding heads vibrate with a rigid phase relation 180° out of phase.

With the process according to the invention, the manufacturing of profile frames becomes substantially more economical in that the processing times are substantially reduced. This is achieved in particular by short melt-on periods and short fitting and holding periods, which are generally in the area of one minute or substantially less. Since the process heat required is relatively low, the welding bulges are relatively small. The outer surfaces can therefore be finish-treated immediately after the welding procedure that is still during the holding or cool-down period, which is highly advantageous.

In order to eliminate an uncertain and non-reproducible welding procedure during the concurrent welding of the surface areas of profile frame members to be joined, the start-up of the friction welding heads is synchronized with start-up positions, which are 180° out of phase and the phase angle between the oscillations of the friction welding heads are controlled during the welding procedure for accurate timing.

In a particularly advantageous embodiment of the invention, an ellipse-shaped vibration pattern is applied to the free ends of the profile rods. If, in a particular case of an elliptical vibration, a circular vibration is utilized, the conditions are particularly advantageous since, with the synchronization of the friction welding heads, the axially resulting force vectors along the engaged profile members can freely oscillate and no longitudinal forces are effective on the profile member engagement structures. As loading force on the profile, only the radical force remains with small resulting force vectors in the longitudinal direction of the profile rod so that, as a result of the 180° phase displacement, an axially oscillating crank movement is achieved between the profile rod holding structures. No outwardly effective moments will occur.

The advantages of the invention also apply to the border case of an elliptical oscillation wherein one axis a or b of an ellipse approaches zero.

Particularly advantageous is the utilization of a multi-head friction welding method for the welding of door or window frames of plastic profile rods. In accordance with the invention, for this purpose, the door or window frames are positioned before the welding on a planar mounting surface such that the surface areas to be joined are disposed adjacent each other, that the friction welding heads are arranged with their profile member clamps at the ends of the profile rods adjacent the surfaces to be joined and are locked therewith during the welding procedure and the friction welding heads are shortly operated depending on the parameters: frequency of the oscillation, amplitude of the oscillation and engagement pressure for the concurrent introduction of the friction welding energy into all surface areas to be joined.

In such a case, with a square frame provided with two vibration heads at each miter joint or, respectively, jointure plane, and a 180° out of phase oscillation and concurrent synchronization of the vibration heads, the force vectors can freely oscillation in the longitudinal direction of the profile rods held in position and no forces are effective on the profile clamps in the longitudinal direction of the profile rods. With the 180° out of phase displacement, all rods oscillate in axial direction at the same time in a clockwise sense and then again in a counter-clockwise sense. Furthermore, a circular movement occurs at the opposite ends of each profile rod, which is opposite to that present at the end of the adjacent profile frame rod which experiences on opposite circular motion so that no outwardly free movements are effective with respect to the plane of jointure. The fact that, in this case, the free movements compensate each other is particularly advantageous for the friction welding method according to the invention.

For the welding of the surface areas to be joined of open or closed profile frames in accordance with the invention, a multi-head friction welding apparatus with several, preferably four, friction welding units, which are adjustably disposed on a machine bed, is utilized. Each friction welding unit consists of two friction welding heads with oscillating plates, which are firmly connected to clamping units. Each clamping unit includes a first clamping plate, which is movable relative to a second clamping plate for engaging a free end of a profile rod of the profile frame. The two friction welding heads assigned to a jointure plane are mounted with their clamping units on an assembly plate so as to be movable relative to each other in such a way that they are adjustable toward the jointure plane in accordance with the exact dimensions of the profile frame. For a proper positioning of the friction welding heads with respect to the angular position of the jointure plane, the assembly plates are supported on the machine bed in parallel guide structures and/or pivotal guide structures so as to be slidable and/or pivotable for position adjustment relative to the jointure plane.

Since, in accordance with the invention, the friction welding heads mounted on the assembly plate and the clamping units of the welding heads are slidably supported so as to be movable toward, and away from, the jointure plane and, furthermore, the position adjustment of the frame to be welded can be synchronized, the welding of the profile frame is facilitated while accurate dimensioning of the profile frame as desired can be achieved.

Since the profile rods of plastic material must not be exposed to excessive clamping forces because of the relatively thin webs disposed in the interior of the profile rods, metal support members are provided in accordance with the invention, which are 1/10 to 10/10 mm smaller than the clamping dimensions of the profile rod and which are added to the profile rod for limiting the clamping forces applied to a profile rod. The clamping unit connected to the oscillating plate of the friction welding head has a U-shaped reception area for the profile rod. A first movable clamping plate is disposed within the U-shaped reception area, whereby the clamping plate can be biased, by way of a profile clamping cylinder, preferably a pneumatic cylinder, vertically against the profile rod disposed in the respective clamping unit, while being supported by a leg of the U-shaped reception area, which leg forms a counter pressure surface.

Finally, the clamping unit preferably has—in a top view—the shape of a rectangular triangle, wherein the base of the U-shaped reception area extends normal to the jointure plane. With this clamping unit design, it is possible to engage in the clamping unit aligned profile rods as well as profile rods to be joined at almost any miter angle and ensure a relative position adjustment which is always normal to the jointure plane.

In order to be able to utilize the friction welding apparatus according to the invention for the welding of window frames, which have relatively short profile rods—standard windows have a profile rod length of at least 26 cm—in accordance with the invention, the motor for the respective friction welding head drive is disposed in parallel with, and behind, the oscillation head and drives the oscillation head by means of a toothed belt. In this way, the two friction welding heads of two adjacent jointure planes can be positioned in close vicinity so that also the shortest commonly used profile rods can be welded together.

The advantages and features of the invention will become more readily apparent from the following description of an embodiment in connection with the accompanying drawings.

DESCRIPTION OF ADVANTAGEOUS EMBODIMENTS

Figure 1:
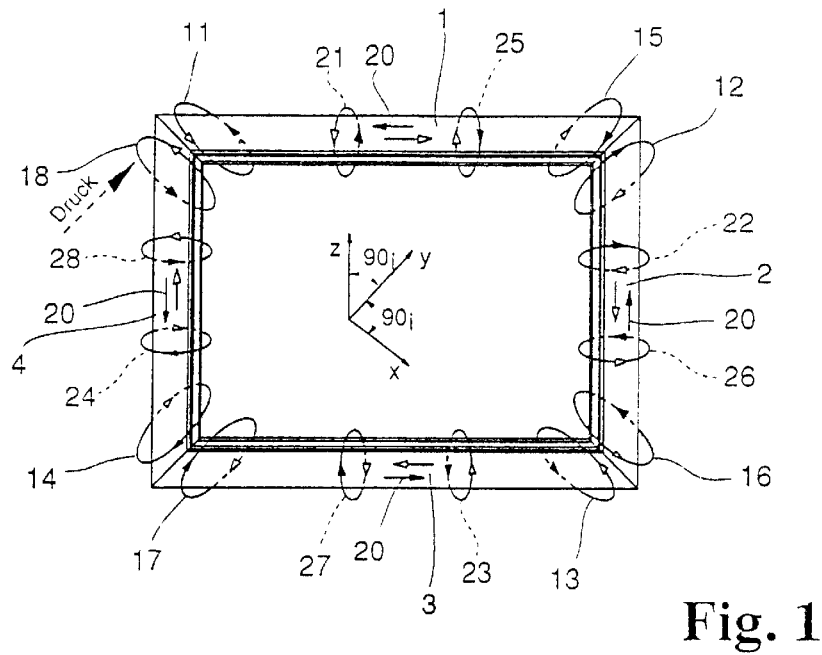
FIG. 1 shows a profile frame for explaining the operation of the invention.

In the following description, the same parts of the embodiment disclosed are designated by the same reference numerals.

The operation of the invention in principle is explained on the basis of the multi-corner frame shown in FIG. 1, which includes four profile rods 1, 2, 3, and 4, that are joined along jointure planes extending at an angle of 45° to the longitudinal direction of the rods.

The oscillation energy needed for the joining by friction welding is introduced into each of the corner areas to be welded by a friction welding unit 30 with two friction welding heads which will be described below in an exemplary manner. To this end, each friction welding head 44 includes a clamping unit 64 with which the end of a profile rod is held in position and the vibration energy is conducted into that end. The two friction welding heads 44 are so supported in the friction welding unit 30 that the jointure surfaces can be pressed against each other in the jointure plane. The ends of the profile rods 1, 2, 3, and 4 held in the clamping unit 64 at opposite sides of the jointure plane are oscillated by the friction welding heads 44 in such a way that the adjoining jointure surfaces oscillate essentially in a 180° opposite phase relationship. As a result, the asymmetrical, that is, not rotational symmetrical ends of the profile frame rods are melted together by local friction energies. The opposite oscillations comprise essentially an orbital or, respectively, circular oscillation pattern. This type of introducing the vibration energy permits the use of a relatively low operating frequency and therefore avoids the generation of annoying noise.

In accordance with the invention such a friction welding unit 30 with two friction welding heads 44 is provided at each miter corner of a rectangular frame. The friction welding heads are so controlled that they oscillate also essentially in phase opposition at the respective opposite free ends of each individual profile rod 1, 2, 3 and 4. By providing a concurrent synchronization of all the vibration heads 44, it is ensured that essentially no tension or pressure forces occur in the longitudinal direction of the profile rod but the thrust vectors 20 can oscillate freely with the profile rods.

With the rectangular profile frame as shown in FIG. 1, the oscillations of the eight friction welding heads 44 acting on the frame are to be synchronized in such a way that the free ends of the adjacent profile rods 4:1, 1:2, 2:3, 3:4 at the four corner areas oscillate at opposite sides of the jointure surfaces in the X, Z and Y, Z directions essentially in opposition. Care must be taken in this connection that the free ends of each individual profile rod are also oscillated essentially in phase opposition. For the circular oscillation as indicated in FIG. 1, the oscillations 11, 12, 13 and 14 are in phase opposition to the oscillations 15, 16, 17, and 18. With this phase pattern of the induced vibration energy, the oscillations may be divided into axial and radial components in such a way that the axial components, which correspond to the thrust vectors 20, are oriented for all profile rods of the profile frame in the same direction so that no tension or pressure forces are effective in the profile frame. The radial components 21, 22, 23 and 24 are in phase opposition to the radial components 25, 26, 27 and 28. As a result, the rod ends in the jointure planes of the corners 4:1, 1:2, 2:3, and 3:4 move in opposite directions providing for friction by which the profile rod material in the jointure planes is liquified to such a degree that, under a pressure applied normal to the jointure plane, the material converges and the two profile rods are joined. The limited amount of heat generated locally during the friction process enters into the profile rod only slightly so that the rod cools down rapidly after the friction welding process.

As parameters for the friction welding procedure there are four values, namely the frequency and the amplitude of the oscillation as well as the pressure and the time during which the two jointure surfaces are pressed into engagement with each other.

For a circular oscillation the frequency introduced into all profile rods should be between 20 Hz and 500 Hz depending on the material of which the rods consist. The oscillation has a maximum amplitude of less than 3 mm. The time for the cool-down of the welding area is generally less than 30 s.

For the special situation, in which a profile rod or the end of a profile rod is firmly held in position and the adjacent profile rod or profile rod end is oscillated, the frequency for the profile rod or profile rod end held in position is zero Hertz.

Within these values, there may be substantial variations depending on the material of which the profile rods consist. If a thermoplastic material (PVC) with an E modulus of about 2800 Nm at room temperature is used, the welding process may be completed with an oscillation frequency of 75 Hz and an amplitude of about 0.4 mm already after a few seconds. These conditions are advantageous also with respect to avoiding the generation of noise.

For performing the friction welding procedure as described above, a friction welding head as known from DE-OS 44 36 857 is particularly suitable. The use of this welding head has the advantage that several friction-welding heads can be easily synchronized. Particularly, a good start-up synchronization is possible so that the friction welding procedure starts out with the desired phase and the phase relationship between the individual friction welding heads can be safely maintained. In this known arrangement, the friction-welding head includes a control excenter and a parallel guide arrangement by way of which an input rotational energy can be converted to a parallel-guided circular movement energy. For the start-up synchronization, all the excenters of the individual friction-welding heads are brought to a fully extended position and each second head is then moved to a 180° displaced start up position. Only in the opposite phase position, the profiles are clamped on and the friction welding heads are then operated for the friction welding joining procedure.

Figure 2:
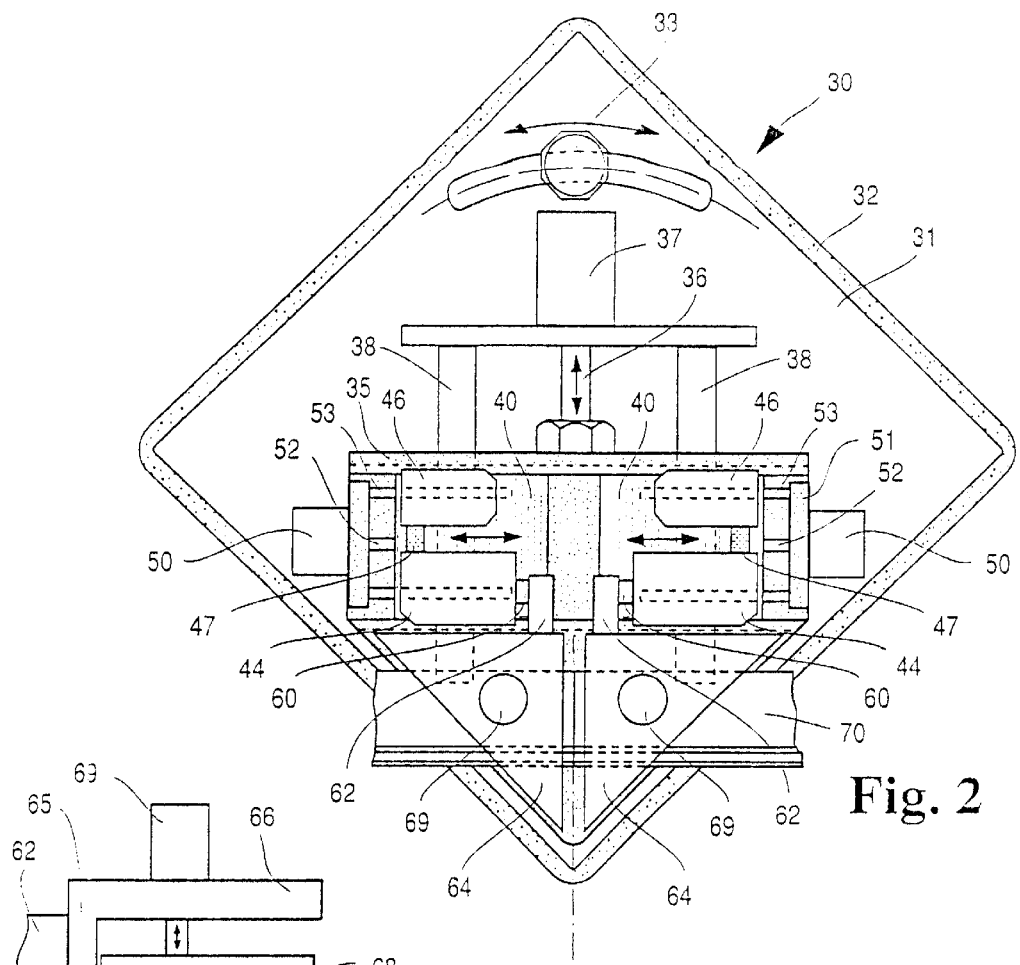
FIG. 2 is a top view of a friction welding unit with two profile rod sections, which are to be welded together in linear alignment.

A friction welding unit with two such known vibration heads is shown in FIG. 2 in a top view. This friction welding unit 30 is mounted on a table 32, which is rotatable with respect to a base plate 31 and whose rotational position can be locked in by way of a locking screw 33. On the rotating table 32, a mounting plate 35 is so supported that, with regard to FIG. 2, it can be moved in north-south direction. For this purpose, an axial cylinder 37 is provided which includes a thrust shaft 36 that engages the mounting plate 35 and is capable of reciprocating it along guide means 38 including ball bearing structures 39. On the mounting plate 35, slide members 40 are supported so as to be movable in profiled guide tracks in the east-west direction with regard to FIG. 2.

On the respective slide members 40, the two friction welding heads of a friction welding unit 30, which will be designated below as excenter oscillation heads 44, are mounted. They are driven each by a motor 46 preferably by way of a toothed drive belt 47. This motor 46 is preferably arranged—in north-south direction—behind the excenter oscillation head 44 so that the friction welding unit 30 can be as small as possible, whereby the friction welding of profile frames with relatively short profile rods is made possible.

The displacement of the slide members 40 and, together therewith, the excenter oscillation heads 44 normal to the north-south direction according to FIG. 2 occurs with the aid of axial cylinders 50, which are mounted on mounting walls 51 at both sides of the mounting plate 35. The cylinder shaft 52 extending from the respective axial cylinder 50 is connected to the respective slide member 40 and facilitates the sliding thereof toward the jointure plane extending also in north-south direction between the excenter oscillation heads. Guide shafts 53, which are mounted on the mounting wall 51, have the purpose of ensuring a tilt-free sliding of the slide members 40. However, any other slide arrangements are suitable. These guide shafts may also cooperate in a conventional manner with a linear ball bearing structure.

Figure 4:
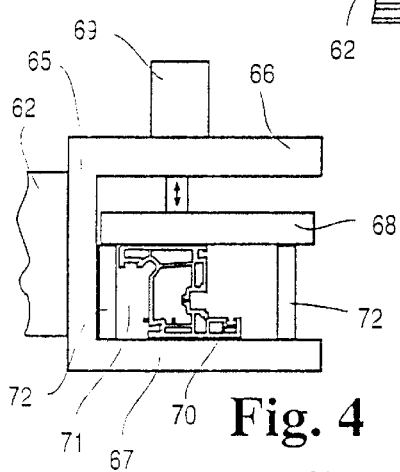
FIG. 4 is a slightly enlarged side view of the clamping unit.
Figure 3:
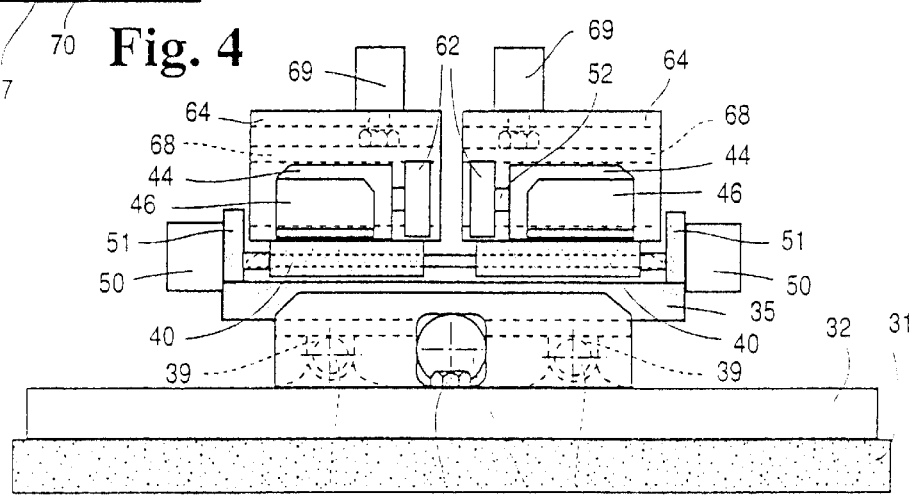
FIG. 3 is a side view of the friction welding unit.

The vibration energy required for the joining by friction welding is transferred from the excenter vibration heads 44, by way of an excenter shaft 60 and an oscillation plate 62, to the clamping unit 64. This clamping unit has, in a top view, the shape of a rectangular triangle and is provided, in a side view according to FIG. 4, with a U-shaped reception area 71, whose base extends normal to the jointure plane. The upper legs 66 and the lower legs 67, which are triangular in a top view, extend over the full width of the profile rods which are to be worked on and which are retained within the U-shaped reception area 71 by means of a clamping plate 68. The clamping plate 68 can be firmly engaged vertically with the profile rod inserted with the aid of profile rod clamping cylinders 69. In order to limit the clamping forces, which can be applied for example to a thermoplastic profile rod, metal inserts 72 may be placed into the U-shaped reception area 71 of the clamping unit 64. The metal inserts 72 may be smaller, by about 2/10 mm, than the dimensions of the respective plastic profile rods and carry the excess forces generated by the profile clamping cylinder 69. In this way, the engagement force applied to the profile rods is limited which must be taken into consideration when determining the parameters for the joining by friction welding.

Figures 5, 6:
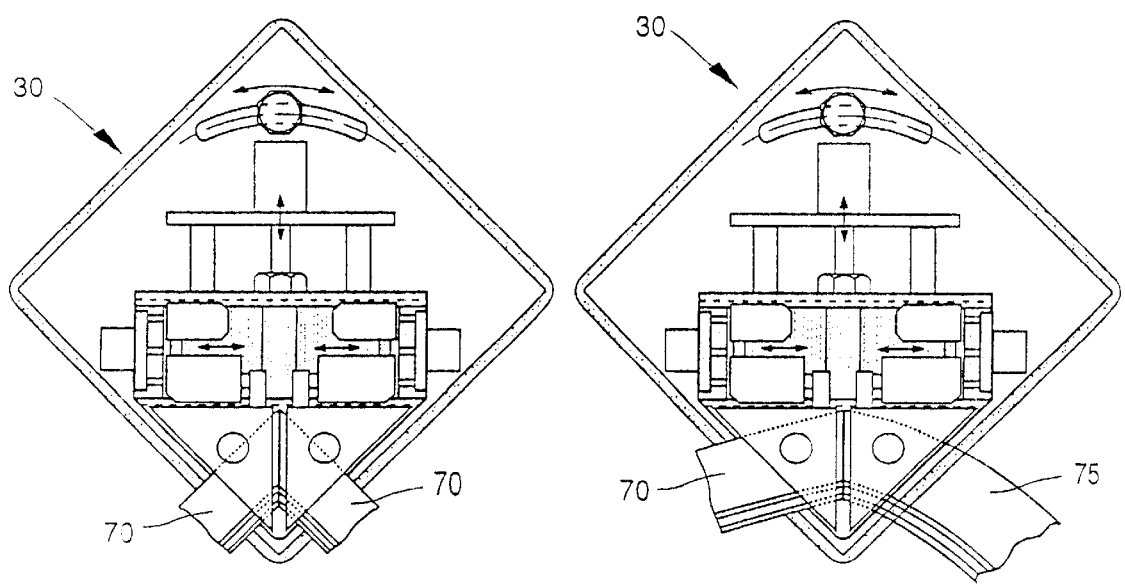
FIG. 5 is a top view of the friction welding unit with two profile rod sections which are to be welded together at a right angle.
FIG. 6 is a top view of the friction welding unit during the welding of a straight profile rod to a curved profile rod.

In the clamping units 64 of the friction welding unit 30 shown in FIG. 2 sections of two profile rods 70 are shown, which are welded together in the jointure plane in an aligned position. FIG. 5 shows an arrangement of the profile rods for a 45° corner welding whereas FIG. 6 shows the welding of a straight profile rod to a curved profile rod 75.

It can be seen from the representations that the rectangular arrangement of the upper and lower legs 66, 67 of the clamping unit 64 permits the welding of two profile rods at almost any angle.

Figure 7:
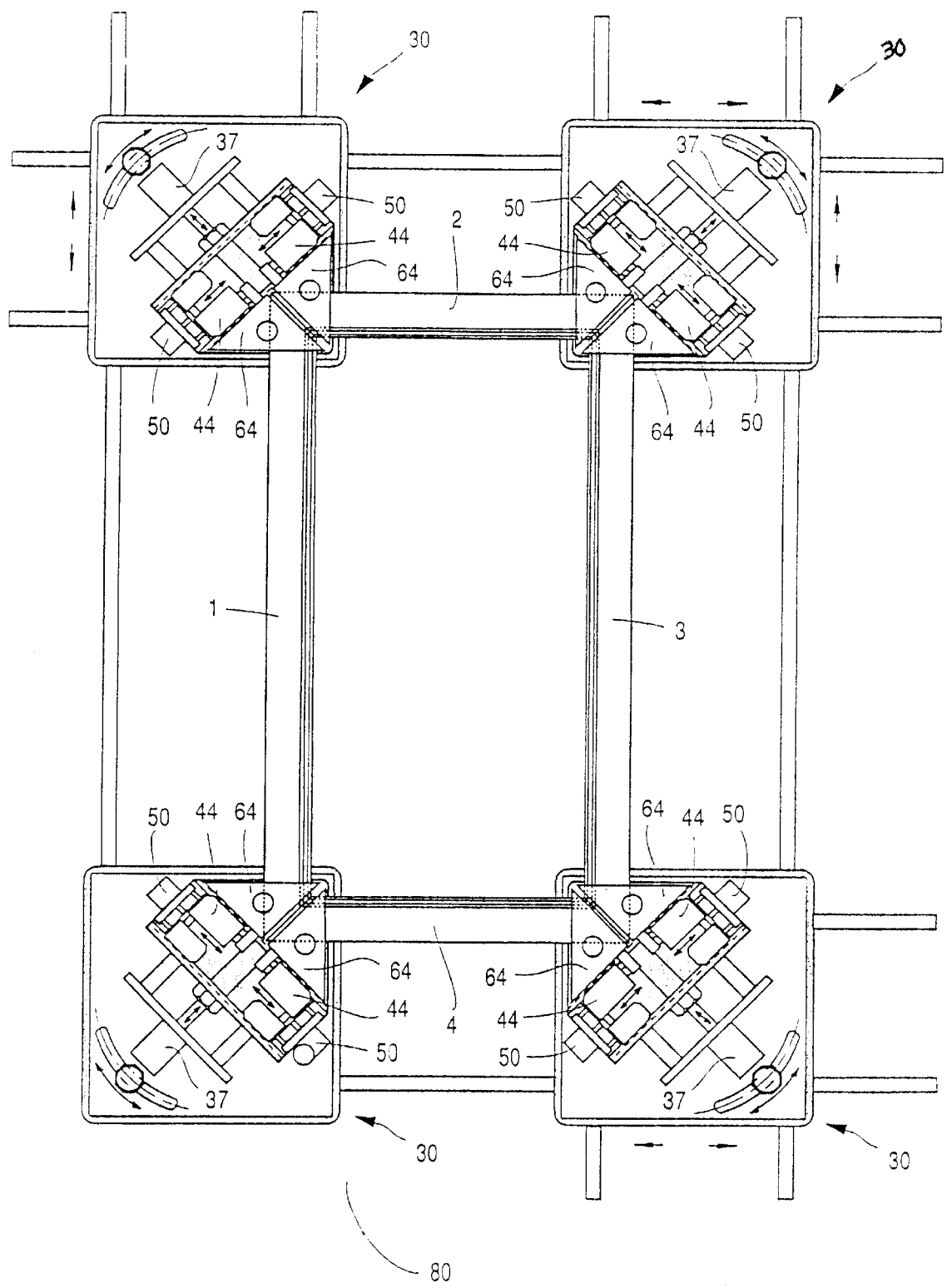
FIG. 7 is a top view of a multi-head friction welding apparatus for the welding of a rectangular profile frame.

FIG. 7 shows a multi-head friction welding apparatus for the welding of a rectangular profile frame. In order to permit welding of the frame at the same time at all four corners, the friction welding units 30 must first be so positioned that the profile rods 1, 2, 3 and 4 can be inserted into the clamping units 64 with their surfaces to be joined disposed adjacent each other. To this end, the friction welding units 30 are arranged on a machine bed 80 so as to be movable thereon which is indicated at the sides of the friction welding units by double arrows. An explanation of the structure permitting the displacement of the individual friction welding units is not necessary because this can be achieved by many conventional means.

After the accurately fitted insertion of the profile rods 1, 2, 3, and 4 into the clamping units 64 of the individual friction welding units 30 and before the clamping, care is taken that, with the earlier mentioned startup synchronization, all heads start up in proper phase relationship in order to avoid their displacement in the clamping arrangement. The coordination of the friction generating movements permits the concurrent welding of several corner areas. As already explained the longitudinal forces in the profile rods are practically non-relevant. This also complies with the requirement that the clamping forces for holding the profile rods in position during the welding should be relatively small. During the introduction of the oscillation energy, a pressure is applied to the profile rods toward the jointure surfaces in order to weld the profile frame to the accurate dimensions upon softening of the material.

Figure 8:
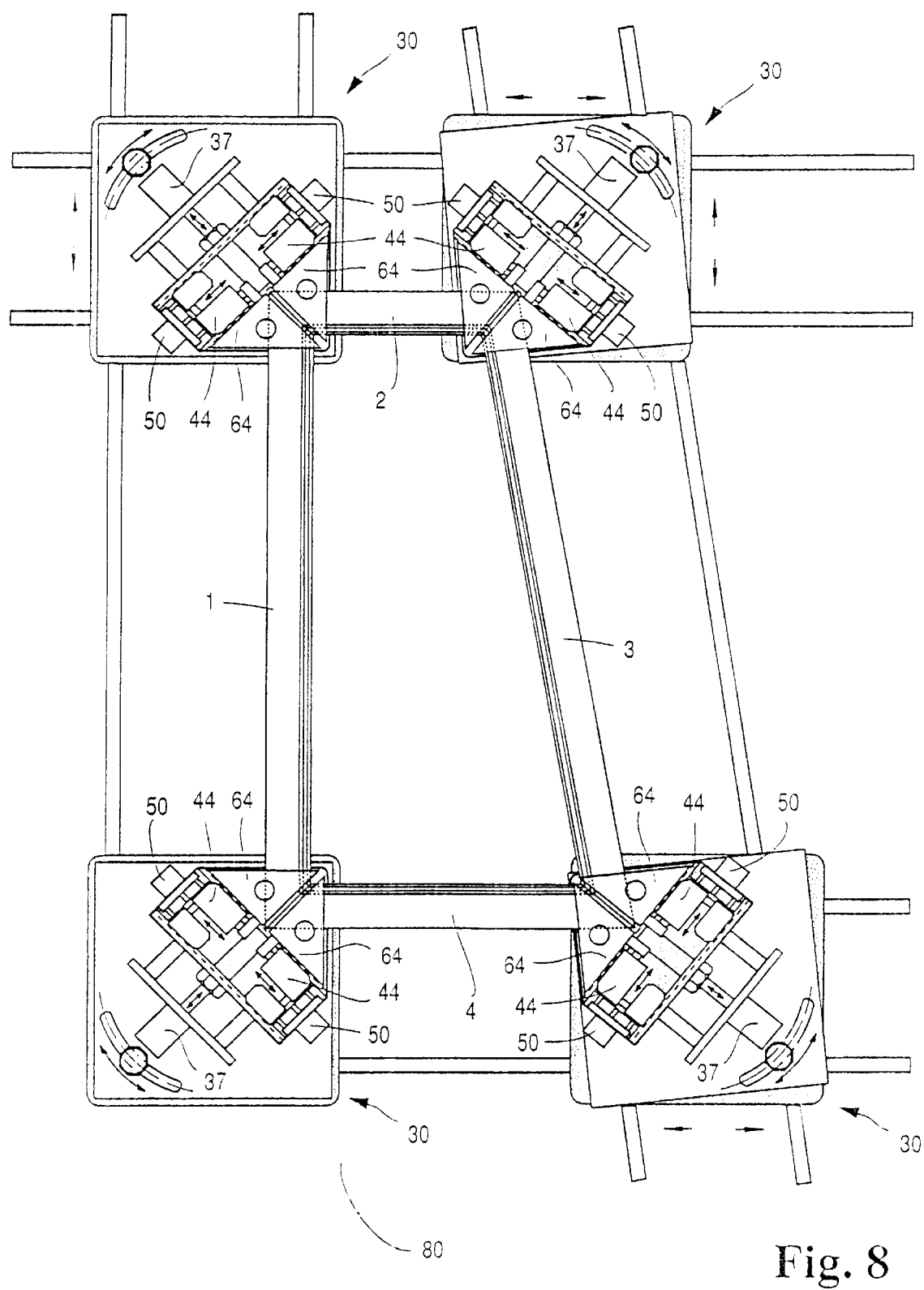
FIG. 8 is a top view of a multi-head friction welding apparatus for the manufacture of a profile frame with other than rectangular corner joints.

FIG. 8 shows, like FIG. 7, a multi-head friction welding apparatus for the jointure, by friction welding, of a four-corner profile frame with corner connections other than 90°. The corner shown in FIG. 8 at the upper right includes jointure surfaces angled at a greater than 45° miter angle whereas the jointure surfaces of the right lower corner have a miter angle of less than 45°. In order to bring the jointure surfaces in the jointure plane in the proper position and to adjust the friction welding apparatus to the jointure plane, the rotating table 32 is turned with respect to the base plate 31 and is fixed by means of the locking bolt 33 disposed in a corresponding guide slot. After such an adjustment of the friction welding unit 30 to the jointure plane and a corresponding displacement of the friction welding unit 30 on the machine bed 80, the profile frame, after the insertion and clamping down of the profile rods in the friction welding units, can be welded together according to the steps described earlier. However, in order to ensure that, if possible, also in this case no thrust vectors occur in the axial direction, the amplitude of the introduced oscillations must be adapted to the miter angle: For acute angles of less than 45°, the amplitudes should be smaller than for obtuse angles over 45°.

Since with the friction welding joining procedure according to the invention the melting depths are very small, only short cooling periods are required and, as a result, only a small amount of welding material is squeezed out of the jointure seam. Consequently, only little finishing work is required if any such work is necessary at all. If it should be necessary to remove some material displaced by the welding, particularly in the internal profile frame area, this can be done immediately following the friction welding procedure.

With the procedure according to the invention essential advantages are obtained since the processing time is substantially reduced when compared with the conventional mirror welding procedure and the finishing work for the removal of displaced welding material can be performed immediately after the joining since the welding seam cools down rapidly.

Although not discloses in detail, with the method according to the invention open frames with two or three corners, that is an uneven number of corners, and closed frames of four and more corners with an even number of corners can be manufactured without any problems.

The above explanations are based on the introduction of a circular oscillation using the excenter oscillation heads whereby about 100% energy input is achieved. It is of course possible to use also other oscillation modes such as for example elliptical and linear oscillation modes if the requirements for the phase arrangement and the synchronization of the excenter oscillation heads can be met.

What is claimed is:

1. A multi-head friction welding process for the concurrent welding in friction welding heads of the jointure surfaces of profile frames consisting of individual profile rods, said process comprising the steps of:

clamping the individual profile rods of the profile frames firmly in position in a friction welding head at opposite sides adjacent the jointure surfaces, pressing the jointure surfaces toward each other, oscillating respective free ends of the profile rods at opposite sides of the jointure surfaces by means of the friction welding heads, wherein the two friction welding heads oscillate in the X,Z and the Y,Z direction essentially in an opposed phase relationship, and oscillating the friction welding heads associated with the two free ends of each individual profile rod also essentially in an opposite phase relationship.

2. A multi-head friction welding process according to claim 1, wherein the two friction welding heads oscillate out of phase by 180°.

3. A multi-head friction welding process according to claim 1, wherein the startup of the friction welding heads is synchronized for a start at opposite phase positions, and the phase angle between the oscillations of the friction welding heads is controlled during the welding procedure so as to remain accurately tuned.

4. A multi-head friction welding process according to claim 1, wherein an elliptical oscillation pattern is applied to the free ends of the profile rods.

5. A multi-head friction welding process according to claim 1, wherein the method is used in the welding of door and window profile frames of plastic material.

6. A multi-head friction welding process according to claim 5, comprising the additional steps of:

positioning, before the welding, the window frame on an assembly plane so that the surfaces to be joined are disposed adjacent each other, positioning the friction welding heads including profile clamps at the ends of the profile rods adjacent the surfaces to be joined and moving the friction welding heads toward each other during the welding, and shortly operating the friction welding heads depending on the parameters: frequency of the oscillation, amplitude of the oscillation and engagement pressure for the concurrent introduction of the friction welding energy into all jointure surfaces.

7. A multi-head friction welding process according to claim 6, wherein said profile frames include channels which are open toward the interior of the frame and a glass panel or, respectively, insert is inserted into the glass channels before the welding of the profile frame.

8. A multi-head friction welding process according to claim 1, wherein the free ends of the profile rods are subjected to a circular oscillation of between 20 Hz and 500 Hz and an amplitude<3 mm for less than 30 s.

9. A multi-head friction welding apparatus with several, (preferably four), friction welding units adjustably disposed on a machine bed for welding the jointure surfaces of open and closed profile frames each friction welding unit consisting of two friction welding heads including each an oscillation plate with a clamping unit, each clamping unit including first and second clamping plates, which are movable with respect to each other and each of which can be locked to a free end of a profile rod of the profile frame, each jointure plane having two friction welding heads assigned thereto in an arrangement where they are movable relative to each other together with their clamping units in such a way that they are movable toward the jointure plane, and said mounting plate being slidable for the positioning of the friction welding heads relative to the angular orientation of the jointure plane on the machine bed in parallel guide structures and pivotably adjustable in angular guide means for proper orientation of the jointure planes.

10. A multi-head friction welding apparatus according to claim 9, wherein said friction welding heads mounted on the assembly plate and the clamping units connected thereto are supported so as to be movable in opposite directions toward the jointure plane, and the movement is controllable so as to provide for the final desired dimensions of the frame to be welded.

11. A multi-head friction welding apparatus according to claim 10, wherein, for limiting the clamping force applied to the plastic profile rod, metal inserts are provided which metal inserts have a size of 1/10 mm to 10/10 mm less than the clamping dimension of the profile rod.

12. Multi-head friction welding apparatus according to claim 9, wherein the clamping unit connected to the oscillation plate has a U-shaped reception area for the profile rod and the first clamping plate, and a profile clamping cylinder is provided for engaging the first clamping plate vertically with the inserted profile rod.

13. A Multi-head friction welding apparatus according to claim 9, wherein the clamping unit has, in a top view, the shape of a rectangular triangle, wherein the base of the U-shaped reception area extends normal to the jointure plane.

14. A multi-head friction welding apparatus according to claim 9, wherein the motor for driving the respective friction welding head is disposed behind the friction welding head and parallel thereto and a toothed belt is provided for driving the friction welding head.

15. A multi-head friction welding process according to claim 9, wherein blocking rods are provided for the reception of the internal forces effective between adjacent double friction welding units.

* * * * *